Jan. 22, 1963  S. REDNER  3,074,271
PHOTOELASTIC STRAIN GAUGES
Filed Feb. 25, 1960
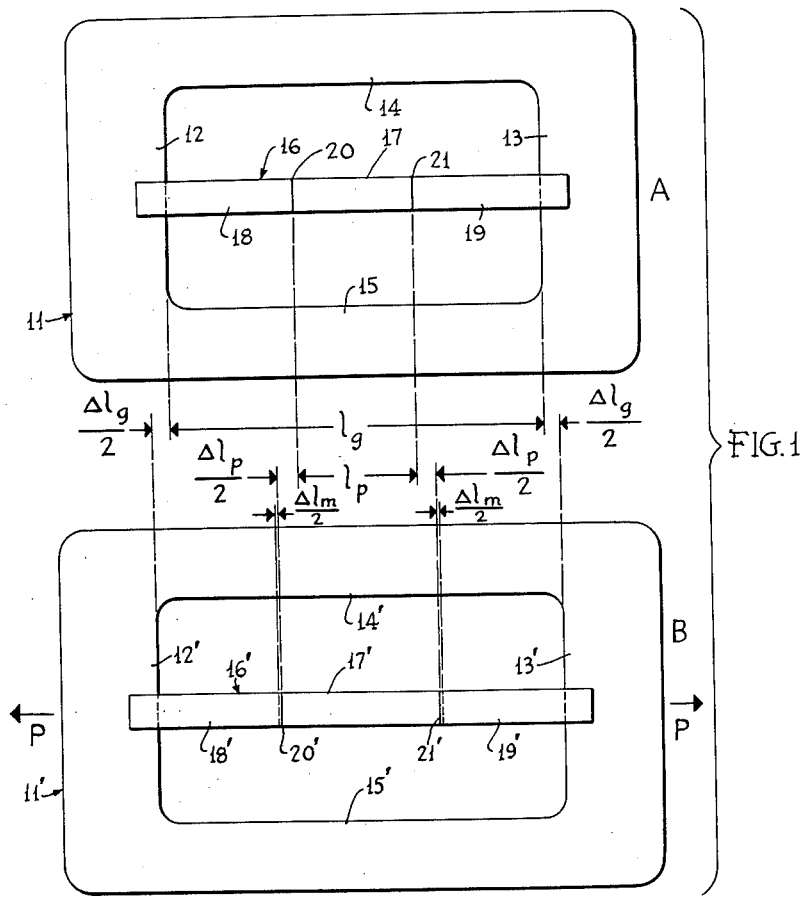
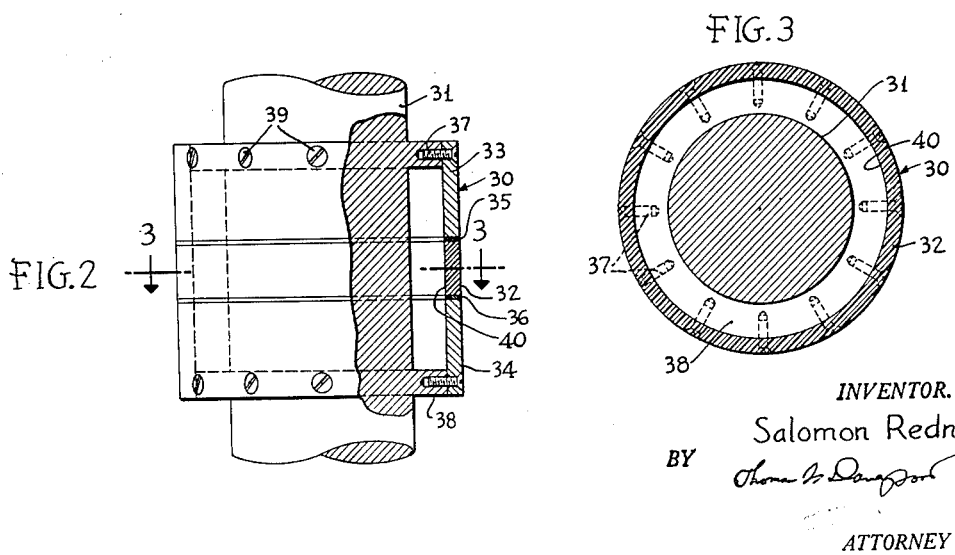
INVENTOR.
Salomon Redner
BY
ATTORNEY

3,074,271
PHOTOELASTIC STRAIN GAUGES

Salomon Redner, Norristown, Pa., assignor to The Budd Company, Philadelphia, Pa., a corporation of Pennsylvania
Filed Feb. 25, 1960, Ser. No. 11,065
5 Claims. (Cl. 73—88)

This invention pertains to photoelastic strain gauges and more particularly to such devices adapted for high-sensitivity indication of gauged-strain magnitudes.

Photoelastic testpieces exhibit a degree of forced-double refraction, birefringence, in proportion to the magnitude of imposed principal stress differences. This birefringence is visualized under polarized light as interference fringe, extinction color, patterns. Color changes appear in succession in a first fringe order and then reappear in higher fringe orders as the principal stress difference increases. Each color of each fringe order is related to a magnitude of principal stress difference and hence to a strain condition of the photoelastic testpiece.

When a uniaxial workpiece strain is imposed upon a birefringent testpiece, and that workpiece strain is proportional to an applied load on the workpiece, the fringe color variations are directly related to the load variations. The precision of load measurements is limited, however, because only a finite increment of color change, hence of load variation, can be detected. The smallest visually determinable increment of color change is approximately $\frac{1}{50}$ of a fringe order.

The obvious expedient for increasing precision has been to increase workpiece gauged-strain ratios relative to workpiece loads. However, workpiece strains are related to workpiece loads in a known and reproducible manner only so long as they are elastic strains. Therefore, gauged-strain magnitudes are limited with the result that the precision of prior photoelastic strain gauges has also been limited. This precision limitation has hampered wide use of photoelastic strain gauges as extensometer and load cell indicators despite the obvious advantages of direct-reading, non-electrical transducers.

Therefore, it is an object of this invention to provide for application as an extensometer or load cell indicator an improved photoelastic strain gauge which gauge imposes amplified unit strains upon a birefringent element thereof relative to corresponding gauged strain magnitudes.

According to this invention, the photoelastic strain gauge comprises two workpiece attachment means which are spaced apart to define a nominal gauge length, a first element of a birefringent material having a relatively low modulus of elasticity, and a second element of a material having a relatively high modulus of elasticity, the first and second elements being mechanically connected in series between the attachment means so that unit strains produced within the birefringent element are amplified with respect to externally imposed gauge length variations.

The features of this invention believed to be novel are pointed out with particularity in the appended claims. However, for a better understanding together with further objects and advantages thereof, reference should be had to the following description taken in conjunction with the accompanying drawing, wherein:

FIG. 1 illustrates application of the photoelastic strain gauge of this invention as a load cell indicator; and FIGS. 2 and 3 illustrate a further embodiment of the photoelastic strain gauge of this invention as applied to a workpiece for elongation and torsional strain measurements.

With particular reference to FIGURE 1, at A is shown a load cell in the absence of external loading; at B, the same load cell is depicted after application of representative loading forces P. Similar reference numerals are unprimed and primed, respectively, to indicate similar items in A and in B.

The load cell spring element 11 is illustrated as a generally rectangular plate apertured centrally to define loading portions 12 and 13, and deforming portions 14 and 15. Thickness of the element may, for example, be considered as equal to the width of deformable portions 14 and 15.

Conventionally, the spring element 11 would be gauged for photoelastic strain indications either by bonding a birefringent testpiece stratum on a surface of element 14 or 15, or by attaching a birefringent testpiece strip at one end to loading portion 12 and at the other end to loading portion 13. In either conventional application the unit strain $e_p'$ imposed upon the testpiece parallel with the gauge length would equal the parallel unit strain $e_g'$ imposed upon the deformable elements 14 and 15. Since the magnitude of $e_g'$ is limited by the elastic properties of spring element materials, usually an alloy steel, $e_p'$ is similarly limited. Therefore, when the least increment of change in testpiece strain detectable is defined as $de_p'$ and the limiting gauge element strain is defined as $e_g''$ at a maximum load $P''$, it follows that load measurement can have a precision of but $\pm P''/(e_g''/de_p')$, regardless of the load cell configuration.

According to this invention, however, the photoelastic strain gauge 16 comprises, in series, a birefringent testpiece strip 17 of a length $l_p$ considerably less than the gauge length, $l_g$, and, in the preferred embodiment, two symmetrical load transfer strips 18 and 19. The elements 17, 18 and 19 are mechanically serially connected as by bonding layers 20 and 21 therebetween. An attachment means is provided at each end of the serial photoelastic gauge and may be, simply, additional adhesive bonding layers at the surface areas subtended between elements 12 and 18 at one end and elements 13 and 19 at the other end.

Preferred birefringent materials such as Bakelite or Celluloid have a modulus of elasticity $E_p$ of approximately $3 \times 10^5$ p.s.i. It is advantageous that strain transfer elements 18 and 19 be of a metal, the alloy steel of load cell spring element 11, for example, having a modulus of elasticity $E_m$ of approximately $3 \times 10^7$ p.s.i. Further, the ratio of the length of the birefringent testpiece $l_p$ to the gauge length $l_g$ should be appreciably less than 1, as will be developed more fully hereinafter, and the cross-sectional areas of elements 17, 18 and 19 should preferably, be substantially equal.

Various attachment expedients may be employed alternatively. For example, elements 18 and 19 may be machined integrally with the load cell spring element 11, or attachment may be mechanical fasteners-clamps, screws, etc. It is necessary, however, that rigid connections are made between elements 18 and 19 and between elements 12 and 13, thereby defining the gauge length as the separation between the attachment means.

When tensile loading forces P are applied to the load cell shown at A, it will be strained parallel with those loading forces and the change of the gauge length may be represented as occurring equally on both sides of a center line. Assuming, as is conventional, that the strength of the gauge 16 is slight relative to that of the deformable elements 14 and 15, the following equation may be written:

$$\Delta l_p = \Delta l_g - \Delta l_m \times \Delta l_g$$

Where $\Delta l_g$ is the strain along gauge length $l_g$, $\Delta l_p$ is the parallel strain of testpiece 17 of length $l_p = l_g/k$, and $\Delta l_m$ is the total parallel strain of strain transfer elements 18 and 19 of total length $l_m = l_g - l_p$.

The practical equivalence of $\Delta l_p$ and $\Delta l_g$ may be seen from:

$$\Delta l_m = \Delta l_p (l_m/l_p)(E_p/E_m)$$

since the ratio $E_p/E_m$ is only about 0.01, for the preferred gauge materials. It follows then that the parallel unit strain $e_p$ in the testpiece 17 is very nearly:

$$e_p = k e_g$$

According to this invention, therefore, there is an amplification of the unit strain of the birefringent material testpiece by an amplification factor $k$, the ratio of the gauge length to the length of the testpiece.

FIG. 2 illustrates a preferred embodiment of this invention for the photoelastic indication of axial or torsional loads. In this embodiment the strain gauge 30 is applied to a shaft 31 which may be loaded in tension and compression or in torsion. As further shown in the cross section of FIG. 3, the arrangement is symmetrical about the shaft axis.

The gauge 30 comprises, in series, a hollow cylindrical birefringent element 32 and hollow cylindrical load transfer elements 33 and 34 mechanically connected by bonding medium annuli 35 and 36. Here, the attachment means comprises annular shoulders 37, 38 formed integrally on shaft 31 and a plurality of machine screws 39.

As above, where the ratio of gauge length, measured between the attachment means, to the parallel length of the test piece is $k$, the parallel unit strain $e_p$ in the testpiece is:

$$e_p = k e_g$$

where $e_g$ is the average unit strain of the shaft 31 between shoulders 37 and 38. As before, this assumes that the ratio $E_g/E_p$ is large, of the order of 100.

Similarly, when a torsional unit strain $\theta_g$ is imposed on shaft 31, the torsional unit strain $\theta_p$ on testpiece 32 will be:

$$\theta_p = k \theta_g$$

where $k$ again represents the amplification generated by the strain gauge of this invention.

Observation of birefringence is preferably by reflection and for that purpose a reflecting layer is applied to the inner surface 40 of the testpiece 32. In some applications it may be desirable that observations be made through the testpiece 32 and in which cases the shaft 31 should be apertured about a diameter intersecting the testpiece 32. Of course, the birefringence of testpiece 17 in FIG. 1 may be observed either by transmission or by reflection.

Various other substitutions and modifications in the elements of the strain gauges of this invention will be apparent to those skilled in the art and it should be noted, therefore, that this invention is not to be restricted by the illustration and explanation of specific embodiments.

What is claimed is:

1. A photoelastic strain gauge combination comprising first and second workpiece attachment means spaced apart to define a gauge length, a first optically strain sensitive element of forced-birefringent material having a relatively low modulus of elasticity, and a second load transfer element of a material having a relatively high modulus of elasticity, said first and second elements being mechanically connected in series between the attachment means, whereby unit strains produced within the forced-birefringent material element are amplified with respect to externally imposed gauge length deformations.

2. The strain gauge combination of claim 1 wherein said elements have substantially similar cross-sectional areas, the ratio of the length of the first element to the gauge length is less than 1, and the material of said second element is a metal.

3. photoelastic strain gauge for indicating magnitude of loads applied to a general cylindrical workpiece, which gauge comprises two annular workpiece attachment means spaced apart to define a gauge length, a hollow cylindrical forced birefringent material testpiece, and a hollow cylindrical load transfer element, said element and said testpiece being mechanically connected in series between said attachment means so that unit strains produced within the testpiece are amplified with respect to externally imposed gauge length deformations.

4. The strain gauge of claim 3 including two similar load transfer elements attached to opposite ends of said testpiece by annular layers of a bonding medium.

5. The strain gauge of claim 3 including a cylindrical reflector contiguous with the interior cylindrical surface of said testpiece.

References Cited in the file of this patent
UNITED STATES PATENTS

| | | |
|---|---|---|
| 2,014,688 | Mabboux | Sept. 17, 1935 |
| 2,625,850 | Stanton | Jan. 20, 1953 |
| 2,801,388 | Ruge | July 30, 1957 |